JOHN D. POWERS.
Improvement in Scroll-Sawing Machines.

No. 126,740. Patented May 14, 1872.

Witnesses:
Chas. Nida
Geo. W. Mabee

Inventor:
J. D. Powers
per
Munn & Co
Attorneys.

ered under the right-hand end of the table, as before stated. E is the driving-belt;
UNITED STATES PATENT OFFICE.

JOHN D. POWERS, OF ORWELL, VERMONT.

IMPROVEMENT IN SCROLL-SAWING MACHINES.

Specification forming part of Letters Patent No. 126,740, dated May 14, 1872.

Specification describing a new and Improved Scroll-Saw, invented by JOHN DARWIN POWERS, of Orwell, in the county of Addison and State of Vermont.

My invention consists of a hand-power scroll or jig saw, in which a cranked driving-pulley is mounted with the crank under the right-hand end of the saw-table, where it can be reached readily by the right hand for turning, while the left hand guides the work to the saw. From this driver a pitman-shaft, directly under it, is driven by a belt and small pulley, and a pitman directly under the saw connects with the apex of a triangular frame pivoted at a considerable distance to the rear of the saw, and beyond the pivot connected by swivel-jointed rods with the rear of a similarly-constructed and pivoted frame, between which two frames, at the front ends, the saw is stretched by said swivel-jointed rods. The saw is connected, at the lower end, to a rod, shifting forward and back on the front end of the lower stretching-frame to vary the pitch for thick or thin stuff, and to the lower end of which the pitman is connected; and the upper end is connected to an iron plate capable of rising and falling, in the end of the upper frame, and having a short eccentric lever in the upper end, for raising and lowering it to make the saw fast and loose. A bellows is applied for blowing the dust away from the work, and it is so attached to the working-gear that the blast is made when the saw is moving up, in order to divide and equalize the work between the up and down strokes.

Figure 1:
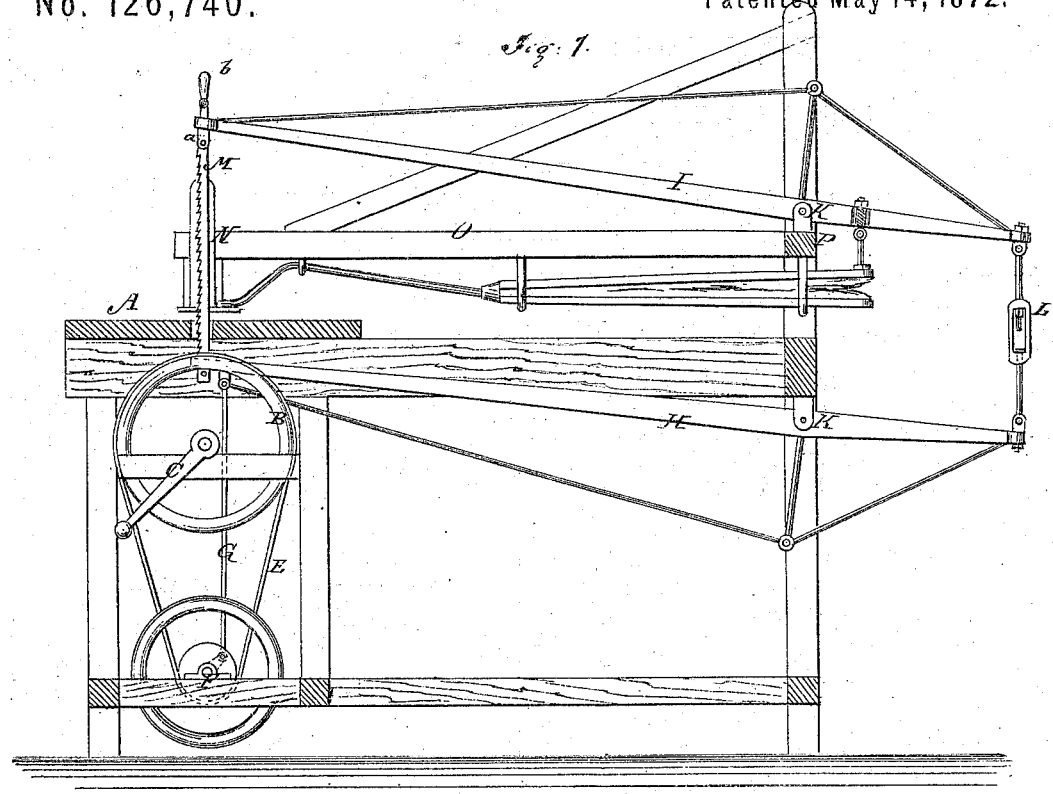
Figure 2:
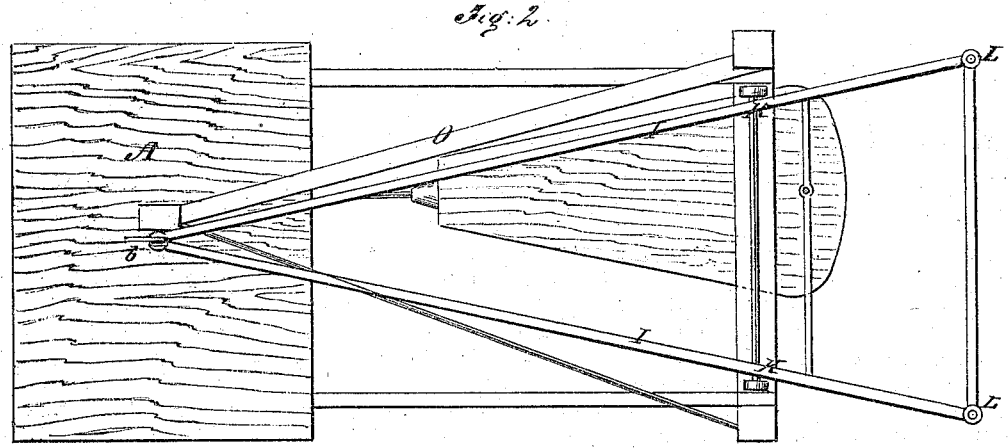
Figure 3:
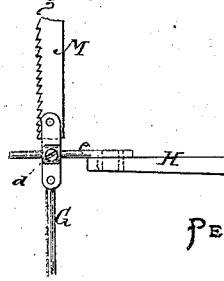

Figure 1 is a longitudinal sectional elevation of my improved sawing-machine, and Fig. 2 is a plan view. Fig. 3 shows the manner of connecting the saw and pitman to the lower frame.

Similar letters of reference indicate corresponding parts.

A is the saw-table; B, the driving-pulley; and C, the hand-crank, said crank being arranged under the right-hand end of the table, as before stated. E is the driving-belt; F, the pitman-shaft; G, the pitman; H, the lower triangular frame; and I, the upper one, both of which are pivoted on knife-edged pivots at K, beyond which they extend for a short distance, and are connected by the swivel-jointed ends L, for straining the saw M, which is connected to these frames at the other ends, being connected to the upper one by the short bar $a$, of iron, capable of rising and falling in the end of said frame, and having a hand-lever pivoted to the upper end whose lower end is of eccentric form, and being turned down against the upper side of the frame I by an upward movement of the handle, raises said bar $a$ and makes the saw fast; and being turned the other way, as readily loosens it for taking out. The lower end of the saw is connected to the short bar $d$, which is fitted to the rod projecting from the apex of the frame H, so as to slide along on it to vary the pitch of the saw, and is made fast by a set-screw, and has the upper end of the pitman connected to its lower end. The presser-foot N is supported on an arm, O, projecting from the rear part of the frame, and is adjustable for thick or thin work. The bellows is suspended from said part O of the frame, and from the rear cross-bar P, and is connected to the upper frame I behind its pivot, so that it is closed and the blast forced out during the upward movement of the saw when it is not in motion, at which time the labor expended is not required so much for actuating the saw as when going down.

Having thus described my invention, what I claim as new, and desire to secure by Letters Patent, is—

A saw, provided with flexibly-connected triangles H I L, in combination with the bellows arranged between said triangles and with respect to said saw, as and for the purpose described.

JOHN DARWIN POWERS.

Witnesses:
C. E. BUSH,
W. B. MIGHT.